(12) United States Patent
Charrat

(10) Patent No.: US 6,905,074 B2
(45) Date of Patent: Jun. 14, 2005

(54) NON-CONTACT INTEGRATED CIRCUIT READER COMPRISING A LOW POWER CONSUMPTION ACTIVE STANDBY MODE

(75) Inventor: Bruno Charrat, Aix en Provence (FR)

(73) Assignee: Inside Contactless, Aix-en-Provence (FR)

(*) Notice: Subject to any disclaimer, the term of this patent is extended or adjusted under 35 U.S.C. 154(b) by 0 days.

(21) Appl. No.: 10/871,947

(22) Filed: Jun. 18, 2004

(65) Prior Publication Data

US 2004/0256460 A1 Dec. 23, 2004

Related U.S. Application Data

(63) Continuation of application No. PCT/FR02/04361, filed on Dec. 13, 2002.

(30) Foreign Application Priority Data

Dec. 18, 2001 (FR) .............................................. 01 16329

(51) Int. Cl.[7] .............................................. G06K 19/06
(52) U.S. Cl. ...................................................... 235/492
(58) Field of Search ................................ 235/492, 439, 235/451

(56) References Cited

U.S. PATENT DOCUMENTS

5,352,877 A * 10/1994 Morley ........................ 235/439

FOREIGN PATENT DOCUMENTS

| EP | 0 391 559 A2 | 10/1990 |
| FR | 2 780 585 A1 | 12/1999 |

* cited by examiner

Primary Examiner—Karl D. Frech
Assistant Examiner—Lisa M. Caputo
(74) Attorney, Agent, or Firm—Akin, Gump, Strauss, Hauer & Feld, LLP (57) ABSTRACT

A contactless integrated circuit reader includes an antenna coil for emitting an oscillating magnetic field, and circuitry for detecting the presence of a contactless integrated circuit within a communication perimeter of the reader without receiving an identification message. The detection circuitry include circuitry for emitting short magnetic field pulses, circuitry for extracting from the antenna coil an envelope signal having envelope pulses corresponding to the magnetic field pulses, and circuitry for monitoring the amplitude of the envelope pulses, arranged for detecting a variation in the amplitude of the envelope pulses representative of the entry of the contactless integrated circuit into the communication perimeter of the reader.

17 Claims, 3 Drawing Sheets

NON-CONTACT INTEGRATED CIRCUIT READER COMPRISING A LOW POWER CONSUMPTION ACTIVE STANDBY MODE

CROSS-REFERENCE TO RELATED APPLICATIONS

This application is a continuation of International Application No. PCT/FR02/04361, filed Dec. 13, 2002, and the disclosure of which is incorporated herein by reference.

BACKGROUND OF THE INVENTION

The present invention relates to the field of data transmissions by inductive coupling. In particular, the present invention relates to contactless integrated circuit readers, used to exchange data with portable electronic objects comprising a contactless integrated circuit, such as contactless smart cards, contactless electronic tags, contactless electronic badges, and the like. More particularly, the present invention relates to a contactless integrated circuit reader comprising an antenna coil for emitting an oscillating magnetic field, and means for detecting the presence of a contactless integrated circuit within a communication perimeter of the reader without receiving an identification message. The present invention also relates to a method for detecting the presence of a contactless integrated circuit within a communication perimeter of a contactless integrated circuit reader, without receiving an identification message.

In recent years, contactless integrated circuits have considerably developed and data transmission methods by inductive coupling are currently the subject of various protocols some of which are standardised, such as those described by the ISO/IEC 15693 and ISO/IEC 14443 standards for example.

These protocols comprise provisions whereby a reader can detect the presence of a contactless integrated circuit within its communication perimeter, so as to engage a communication. Such provisions often involve an identification request that must be repeatedly sent out by the reader. Upon receiving such a request, the integrated circuit present in the interrogation field of the reader sends back an identification message. The identification message can be personalised and comprise an identification number of the integrated circuit, such as its serial number or any other identifier. The identification message can also be a simple anonymous identification signal, such as a period of modulation of the amplitude of the magnetic field performed by load modulation. In applications in which several contactless integrated circuits are likely to be within the communication perimeter of a reader simultaneously, the identification request is coupled with an anti-collision protocol whereby one and only one integrated circuit can be selected.

This integrated circuit detection/identification method requires the reader to permanently emit an alternative magnetic field or, at least, to send magnetic field bursts of a sufficient duration to enable the identification request to be sent and the identification message to be received or at least magnetic field bursts of a sufficient duration for the integrated circuit to be able to extract a supply voltage and consume energy, thus attenuating the magnetic field emitted, as proposed for example in application EP 391 559.

Figure 1:
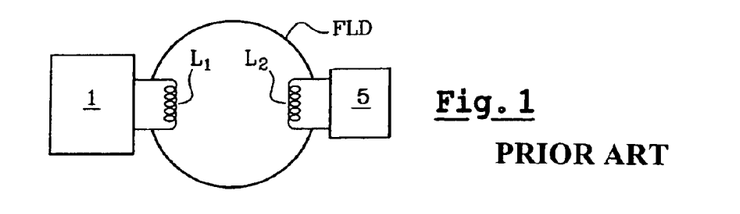
FIG. 1 described above schematically represents a contactless integrated circuit reader and a contactless integrated circuit.
Figure 2:
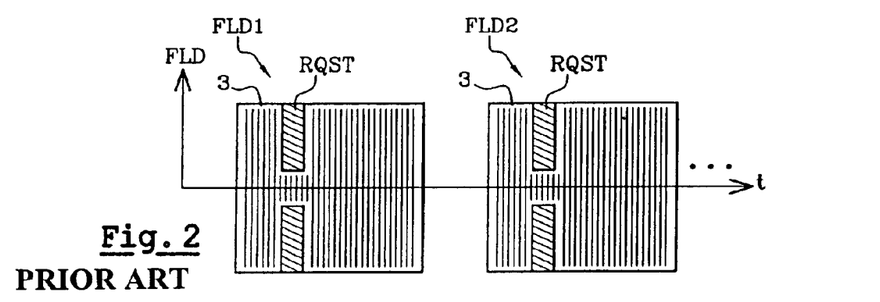
FIG. 2 described above represents the appearance of the magnetic field emitted by a reader upon the sending of an identification request.

For a better understanding, FIG. 1 schematically represents a reader 1 equipped with an antenna coil L1 emitting a magnetic field FLD, oscillating for example at 13.56 MHz or 125 kHz (frequencies often used). Opposite the reader there is a contactless integrated circuit 5 equipped with an antenna coil L2. FIG. 2 represents the general form of the magnetic field. Here, the reader sends magnetic field bursts FLD1, FLD2, etc., each burst lasting at least one millisecond. The carrier frequency of the magnetic field is drawn by vertical lines. The envelope 3 of the magnetic field has an amplitude modulation period during the sending of the request.

This contactless integrated circuit detection/identification method involves significant consumption of current by the reader, to emit the magnetic field. As a result, it is not suitable for applications in which it is desirable for the current consumed by the reader to be low when no integrated circuit is within the interrogation field. These applications particularly relate to readers powered by a battery or an electric cell.

According to other communication protocols, a contactless integrated circuit spontaneously sends an identification message when it detects the presence of a magnetic field emitted by a reader. This mode of detection by spontaneous identification also involves considerable current being consumed since the reader must emit a permanent magnetic field or magnetic field bursts long enough to activate the integrated circuit and enable it to send the identification message (which can consist of a simple identification signal, as indicated above).

To overcome this disadvantage, a method for detecting integrated circuits is known which involves an infrared sender/receiver. Outside the communication periods, the reader is put into an active standby state in which it does not emit any magnetic field and simply monitors the signal received by the infrared sensor. When a contactless integrated circuit (part of a portable object) is within the infrared radiation field, the reader detects a modulation of the infrared reception level and switches into an active mode, in which it emits the magnetic field (in bursts or permanently, with or without identification request). If no identification message is received after a determined number of requests or bursts, the reader goes back to active standby mode.

However, this method requires using an infrared detection system that is complex to implement and which increases the cost/price of the reader. Furthermore, infrared detection is not entirely satisfactory due to the fact that the infrared beam only covers one portion of the space around the reader.

BRIEF SUMMARY OF THE INVENTION

Thus, the present invention comprises a means for detecting a contactless integrated circuit without receiving an identification message and without using an infrared detector.

The present invention is based on the observation that the amplitude of the magnetic field emitted by a reader is substantially altered when the antenna coil of an integrated circuit is within the communication perimeter of the reader. Indeed, when a contactless integrated circuit is close to the reader, the antenna coil of the integrated circuit interferes with the coil of the reader (appearance of a mutual inductance), which substantially de-tunes the antenna circuit of the reader. Furthermore, it is well known that the amplitude of the magnetic field is easy to monitor by extracting an envelope signal from the antenna coil. Thus, one aspect of the present invention is to emit short magnetic field pulses, which only cause insignificant current consumption, and to observe the amplitude of the envelope signal. If, at a given instant, the amplitude of the envelope signal has a variation higher than a determined threshold or a determined attenuation, then, according to the present invention, that means that a contactless integrated circuit has just entered the communication perimeter of the reader.

Thus, the present invention also comprises a contactless integrated circuit reader comprising an antenna coil for emitting an oscillating magnetic field and means for detecting the presence of a contactless integrated circuit within a communication perimeter of the reader without receiving an identification message, wherein the detection means comprise means for emitting short magnetic field pulses, means for extracting from the antenna coil an envelope signal having envelope pulses corresponding to the magnetic field pulses, and means for monitoring the amplitude of the envelope pulses, arranged for detecting a variation in the amplitude of the envelope pulses representative of the entry of the contactless integrated circuit into the communication perimeter of the reader.

According to one embodiment, the monitoring means comprise means for comparing amplitude variations of the envelope pulses with a determined variation threshold, a contactless integrated circuit being presumed to be detected when the amplitude of the envelope pulses has a variation higher than the determined variation threshold.

According to one embodiment, the monitoring means comprise means for comparing the amplitude of the envelope pulses with a determined amplitude threshold, a contactless integrated circuit being presumed to be detected when the amplitude of at least one envelope pulse becomes lower than the determined amplitude threshold.

According to one embodiment, the monitoring means comprise means for generating a reference signal of determined amplitude and means for comparing the amplitude of the envelope pulses with the reference signal.

According to one embodiment, the means for generating the reference signal comprise means for generating a digital amplitude value and a digital-to-analog converter for transforming the digital amplitude value into an analog signal forming the reference signal.

According to one embodiment, the reader comprises means for adjusting the amplitude of the reference signal in the absence of the contactless integrated circuit to be detected.

According to one embodiment, the means for adjusting the amplitude of the reference signal are arranged for adjusting the amplitude of the reference signal during the emission of short magnetic field pulses.

According to one embodiment, the means for adjusting the amplitude of the reference signal are arranged for adjusting the amplitude of the reference signal so that it is substantially lower than that of the envelope pulses.

According to one embodiment, the means for generating the reference signal comprise a capacitor and means for charging the capacitor using the envelope pulses.

According to one embodiment, the reader comprises an analog/digital converter for converting the envelope pulses into a digital amplitude signal comprising amplitude values representative of the amplitude of the envelope pulses, and means for monitoring the digital amplitude signal.

According to one embodiment, the monitoring means are arranged for comparing variations in the digital amplitude signal with a digital variation threshold.

According to one embodiment, the monitoring means are arranged for comparing the digital amplitude signal with a digital amplitude threshold.

According to one embodiment, the monitoring means are arranged for adjusting the digital variation threshold or the digital amplitude threshold in the absence of the integrated circuit to be detected.

According to one embodiment, the monitoring means are arranged for adjusting the digital amplitude variation threshold or the digital amplitude threshold by calculating a mean value of amplitude values.

According to one embodiment, the monitoring means are arranged for adjusting the digital amplitude variation threshold or the digital amplitude threshold during the emission of short magnetic field pulses.

According to one embodiment, the monitoring means are arranged for adjusting the digital variation threshold or the digital amplitude threshold in real time by using the amplitude values of the envelope pulses corresponding to N last magnetic field pulses emitted.

According to one embodiment, the means for extracting the envelope signal form a part of a data receiving circuit of the reader.

According to one embodiment, the reader has a low current consumption active standby mode wherein the reader continually emits short magnetic field pulses and determines upon each pulse whether or not the integrated circuit is detected.

According to one embodiment, the duration of one short magnetic field pulse is shorter than a magnetic field burst enabling the contactless integrated circuit to send an identification message.

According to one embodiment, the duration of one short magnetic field pulse is less than 100 microseconds.

The present invention also comprises a method for detecting the presence of a contactless integrated circuit within a communication perimeter of a contactless integrated circuit reader, without receiving an identification message, the reader comprising an antenna coil for emitting an oscillating magnetic field, comprising the steps of emitting short magnetic field pulses, extracting from the antenna coil an envelope signal having envelope pulses corresponding to the magnetic field pulses, and monitoring the amplitude of the envelope pulses to detect a variation in the amplitude of the envelope pulses representative of the entry of the contactless integrated circuit into the communication perimeter of the reader.

According to one embodiment, a contactless integrated circuit is presumed to be detected when the amplitude of the envelope pulses has a variation higher than a determined variation threshold.

According to one embodiment, a contactless integrated circuit is presumed to be detected when the amplitude of at least one envelope pulse becomes lower than a determined amplitude threshold.

According to one embodiment, the method comprises generating a reference signal of determined amplitude and comparing the amplitude of the envelope pulses with the reference signal.

According to one embodiment, the method comprises adjusting the amplitude of the reference signal in the absence of the contactless integrated circuit to be detected.

According to one embodiment, the adjustment is performed during the emission of at least one short magnetic field pulse.

According to one embodiment, the amplitude of the reference signal is adjusted so that it is substantially lower than that of the envelope signal.

According to one embodiment, the reference signal is a voltage taken off at one terminal of a capacitor charged by means of the envelope pulses.

According to one embodiment, the reference signal is generated by transforming a digital amplitude value, by means of a digital-to-analog converter.

According to one embodiment, the method comprises converting the envelope pulses into a digital amplitude signal comprising amplitude values representative of the amplitude of the envelope pulses and monitoring the digital amplitude signal by comparing variations of the digital amplitude signal with a digital variation threshold or by comparing the digital amplitude signal with a digital amplitude threshold.

According to one embodiment, the digital variation threshold or the digital amplitude threshold is adjusted in the absence of the integrated circuit to be detected.

According to one embodiment, the adjustment of the digital amplitude variation threshold or of the digital amplitude threshold comprises the calculation of a mean value of amplitude values.

According to one embodiment, the digital amplitude variation threshold or the digital amplitude threshold is adjusted during the emission of short magnetic field pulses.

According to one embodiment, the digital variation threshold or the digital amplitude threshold is adjusted in real time by using the amplitude values of the envelope pulses corresponding to N last magnetic field pulses emitted.

According to one embodiment, the method comprises the continual emission of short magnetic field pulses to detect the integrated circuit.

According to one embodiment, the duration of one short magnetic field pulse is shorter than a magnetic field burst enabling the contactless integrated circuit to send an identification message.

According to one embodiment, the duration of one short magnetic field pulse is less than 100 microseconds.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

The method according to the present invention will be described below in relation with an example of classical contactless integrated circuit reader architecture, represented in FIG. 3 and described as an e.g. example, without limitation, of implementation of the present invention.

The reader 10 represented comprises a microprocessor MP, a program memory MEM, an antenna circuit 20, a data sending circuit 30 and a data receiving circuit 40.

The antenna circuit 20 is tuned to a determined resonance frequency, such as 13.56 megahertz (MHz) for example, and comprises an antenna coil L1 connected in parallel with a capacitor C1 to form a circuit L1C1. The circuit L1C1 has one terminal connected to a node 21 and the other terminal connected to the ground. The node 21 is connected to one end of a capacitor C2 the other end of which is connected to the output of the data sending circuit 30. The node 21 is also connected to the input of the data receiving circuit 40.

The data sending circuit 30 comprises an oscillator OSC delivering a primary modulation signal Smp oscillating at a carrier frequency Fc, here 13.56 MHz, which is applied to one input of a modulator circuit MODC. Another input of the modulator circuit MODC is linked to a port PT1 of the microprocessor for receiving data DTx to be sent. The circuit MODC delivers an amplitude modulation signal Sm applied to the input of an amplifier AMP1. The output of the amplifier AMP1 forms the output of the circuit 30 and is connected to the capacitor C2 of the antenna circuit.

The data receiving circuit 40 comprises at input a rectifying diode D1 the anode of which is connected to the node 21 of the antenna circuit and receives an antenna signal. The cathode of the diode D1 is linked to a low-pass filter F1 provided to remove the carrier Fc present in the rectified antenna signal, the filter F1 having for example a cut-off frequency of 1 MHz for a carrier of 13.56 MHz. On the cathode of the diode D1 there is therefore an envelope signal SE that is applied to the input of an amplifier AMP2 through a capacitor C3. The output of the amplifier AMP2 delivers data DTr sent to the reader by load modulation, and is linked to a port PT2 of the microprocessor, in charge of decoding the data DTr. A filter F2, of band-pass or high-pass type, can be provided at the output of the amplifier AMP2 to remove a load modulation sub-carrier, when the communication protocol makes provision for using such a sub-carrier to send data in the contactless integrated circuit-to-reader direction.

Figure 3:
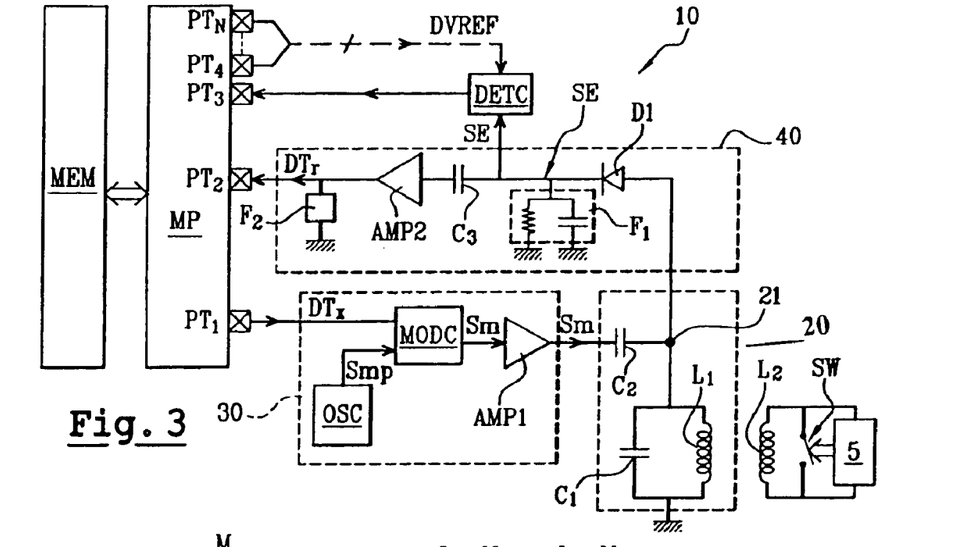
FIG. 3 represents the general architecture of a reader according to the present invention.

To show the operation of the reader 10, which is well-known per se by those skilled in the art, FIG. 3 represents opposite the reader a contactless integrated circuit 5 equipped with an antenna coil L2, the integrated circuit being within the communication perimeter of the reader. The antenna coil 20 delivers an oscillating magnetic field. When data DTx must be sent to the integrated circuit 5, the reader modulates the amplitude of the field according to the data DTx, which can be coded. When data DTr must be sent to the reader by the integrated circuit 5, the integrated circuit short-circuits its coil L2 (total or partial short-circuit) by means of a switch SW, at the rate of the data to be sent DTr (which can be combined with a sub-carrier as indicated above). The coil short-circuits are passed on by inductive coupling in the antenna circuit 20 of the reader, in the form of a load modulation causing a modulation of the amplitude of the antenna signal that finds itself in the envelope signal SE.

As indicated above, waiting for an identification message from the contactless integrated circuit, with or without previously sending an identification request, requires emitting the magnetic field permanently or in the form of bursts of a considerable duration.

To overcome this disadvantage, the reader 10 is programmed so that the reader has an active standby mode wherein the reader 10 emits short magnetic field pulses and monitors the envelope signal.

Figure 4A:
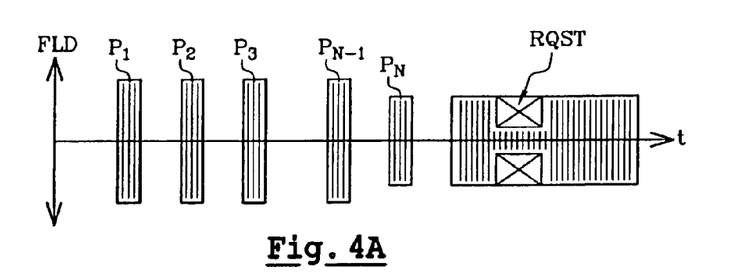
FIG. 4A represents magnetic field pulses emitted by the reader.
Figure 4B:
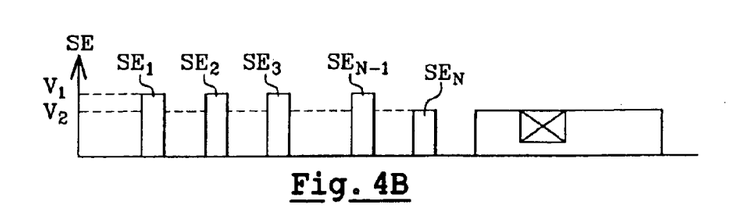
FIG. 4B represents the profile of an envelope signal appearing during the emission of these pulses.
Figure 5:
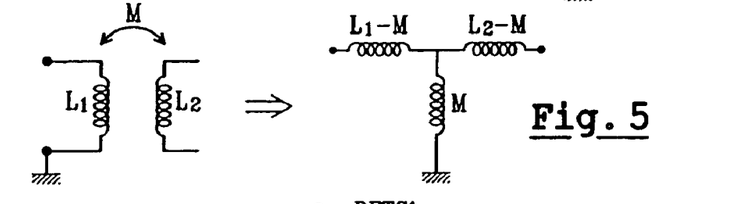
FIG. 5 shows a phenomenon of mutual inductance on which the method of the present invention is based.

For a better understanding, FIG. 5 represents a series of magnetic field pulses P1, P2, P3 ... $P_{N-1}$, $P_N$ according to the present invention, and FIG. 5 represents the profile of the envelope signal SE during the periods of emitting the pulses. The envelope signal SE copies the pulses P1 to $P_N$, and therefore, itself has pulses SE1, SE2 ... $SE_{N-1}$, $SE_N$, or envelope pulses.

The duration Ti of the magnetic field pulses is much shorter than that of classical magnetic field bursts, on the order of 10 to 50 microseconds ($\mu$s) for example. They are spaced out from each other by a duration Ts much longer than their own duration, such as 200 milliseconds (ms) for example. Thus, the average consumption of the antenna circuit is equal to the consumption that the antenna circuit has during the continuous emission of the magnetic field divided by the ratio Ts/Ti, i.e. a consumption reduced by a factor of 2000 to 4000 for pulses of 10 to 50 $\mu$s spaced out by 200 ms. It can be seen in practice that even longer pulses, such as 100 $\mu$s for example, enable very low average current consumption to be obtained and considerable range to be given to a battery-powered reader.

In the absence of the contactless integrated circuit 5, the envelope pulses SE1, SE2 ... $SE_{N-1}$, $SE_N$ have a substantially constant amplitude V1. In the presence of the contactless integrated circuit, the envelope pulses have an amplitude V2 substantially lower than V1. This is shown in FIGS. 4A and 4B, in which it is assumed that the contactless integrated circuit 5 enters the communication perimeter of the reader between the pulse $P_{N-1}$ and the pulse $P_N$. The amplitude of the magnetic field is substantially reduced along with, as a result, that of the envelope pulse $SE_N$. This phenomenon is due to the appearance of a mutual inductance M between the coil L1 of the reader and the coil L2 of the integrated circuit, as shown in FIG. 5. The coil L1 becomes equal to an inductance of value L1-M in series with an inductance of value M, which slightly de-tunes the antenna circuit and attenuates the magnetic field.

It should be noted that such a disturbance of the amplitude of the magnetic field also occurs when a second contactless integrated circuit appears within the communication perimeter, compared to the amplitude that the antenna signal has in the presence of a first contactless integrated circuit. Thus, although in the case considered below a first integrated circuit enters the communication perimeter of the reader, the present invention also relates to the case in which a second integrated circuit enters the communication perimeter, or even a third integrated circuit, etc.

As represented in FIG. 3, the reader 10 is equipped with a monitoring circuit DETC having an output connected to a port PT3 of the microprocessor and an input connected to the anode of the diode D1 of the circuit 40 to receive the envelope signal SE. The input of the circuit DETC could however be connected to any other means for extracting the envelope signal SE, such as an additional diode for example connected to the antenna circuit 20, a current sensor arranged in the antenna circuit, etc.

Figure 6:
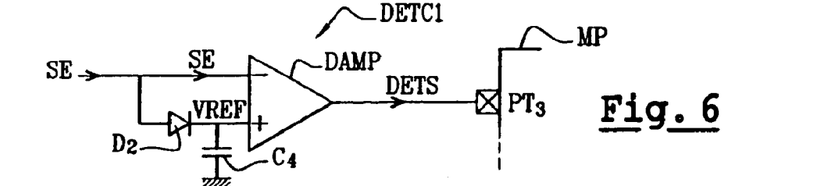
FIG. 6 represents a first embodiment of a monitoring circuit according to the present invention.
Figure 8:
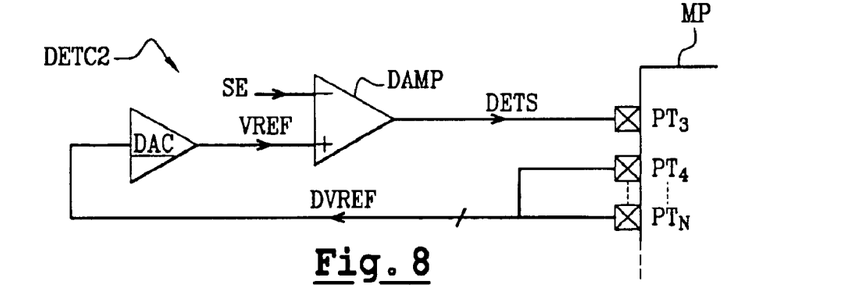
FIG. 8 represents a second embodiment of a monitoring circuit according to the present invention.
Figure 10:
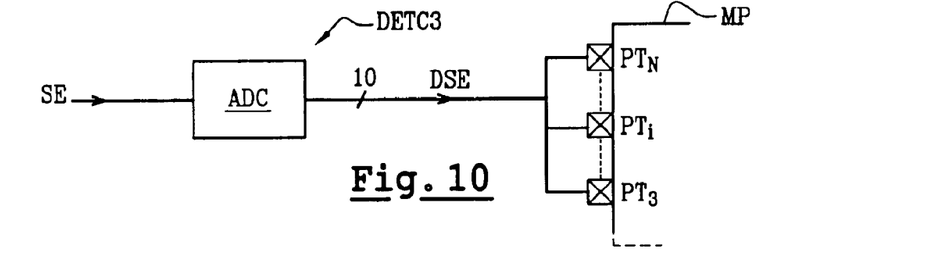
FIG. 10 represents a first embodiment of a monitoring circuit according to the present invention.

Three exemplary embodiments of the circuit DETC are represented in FIGS. 6, 8 and 10 and are respectively referenced DETC1, DETC2, and DETC3.

In the embodiment represented in FIG. 6, the circuit DETC1 comprises a differential amplifier DAMP arranged as a comparator, a capacitor C4 and a diode D2. The amplifier DAMP delivers a detection signal DETS. The capacitor C4 has its cathode linked to the ground and receives at its anode, through the diode D2, the envelope signal SE, reduced by a few tens of Volts due to the voltage drop in the diode D2. The amplifier DAMP receives the envelope signal SE at its negative input. Its positive input receives a reference signal VREF taken off at the anode of the capacitor C2 and equal to the charging voltage of the capacitor.

Figure 7A:
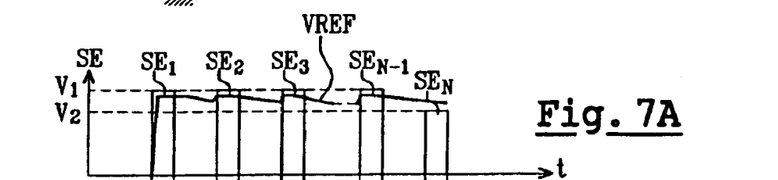
FIGS. 7A–7B represent electric signals showing the operation of the monitoring circuit in FIG. 6.
Figure 7B:
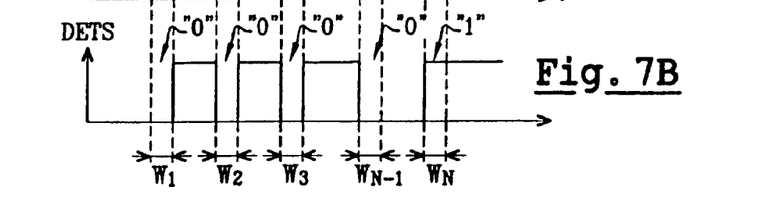

FIG. 7A shows the appearance of the signals SE and VREF upon the emission of the magnetic field pulses P1, P2. $P_{N-1}$, $P_N$ (FIG. 4A). The signal SE has the pulses SE1, SE2. $SE_{N-1}$, $SE_N$ already shown in FIG. 4B, the pulse $SE_N$ being of an amplitude V2 lower than the amplitude V1 of the pulses SE1 to SEN-1 due to the presence of the coil L2 of the contactless integrated circuit. The capacitor recharges upon each new envelope pulse and discharges slightly between two pulses, such that the signal VREF has a mean value between V1 and V2. When the pulse $SE_N$ of amplitude V2 appears, the signal VREF is higher than the amplitude V2 such that the signal DETS is on 1 instead of being on 0, as represented in FIG. 7B.

The implementation of the method of the present invention and of the detector DETC1 means the microprocessor must be programmed accordingly, by means of a program for managing the active standby mode loaded into the program memory MEM. Such a programming operation per se is within the understanding of those skilled in the art, and therefore, will not be described in detail herein. It results from the above that the microprocessor must observe the signal DETS on the port PT3 while the magnetic field pulses P1 to $P_N$ are being emitted, which defines windows W1, W2 ... $W_{N-1}$, $W_N$ for monitoring the signal DETS. The value of the signal DETS outside the monitoring windows is not taken into account and is not significant, due to the fact that the envelope signal SE is zero.

In the embodiment represented in FIG. 8, the monitoring circuit DETC2 comprises the differential amplifier DAMP arranged as a comparator and a digital-to-analog converter DAC. The amplifier DAMP receives the envelope signal SE at its negative input, the signal VREF at its positive input, and delivers the detection signal DETS. The signal VREF is here delivered by the converter DAC which receives at input a digital signal DVREF delivered by ports PT4 to PTN of the microprocessor, via a link represented in dotted lines in FIG. 3, each port PT4 to PTN delivering a bit of the signal DVREF. The signal DVREF is a digital amplitude value and the amplitude of the signal VREF varies according to the amplitude value DVREF.

Figure 9A:
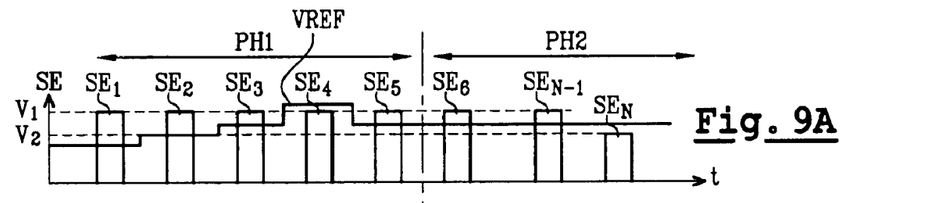
FIGS. 9A–9B represent electric signals showing the operation of the monitoring circuit in FIG. 8.
Figure 9B:
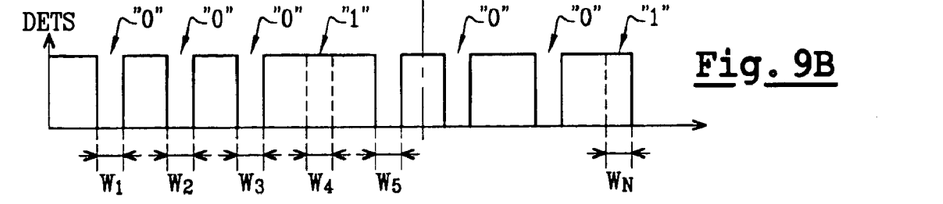

Using the monitoring circuit DETC2 requires a prior adjustment of the signal VREF, as shown in FIGS. 9A and 9B. FIG. 9A shows the appearance of the signals SE and VREF during an adjustment phase PH1 followed by a detection phase PH2, and FIG. 9B represents the signal DETS. It is considered in this example that the reader emits five magnetic field pulses during the phase PH1, causing five envelope pulses SE1 to SE5 to appear. The microprocessor MP gradually increases the amplitude value DVREF, in increments, until the signal VREF becomes higher than the envelope signal SE and the signal DETS changes to 1 in one of the five monitoring windows W1, W2 . . . W5 corresponding to the five envelope pulses. In this example, the amplitude of the signal VREF exceeds that of the envelope signal during the envelope pulse SE4 and the signal DETS changes to 1 in the monitoring window W4. The microprocessor MP then reduces the value DVREF by one increment, such that upon the following pulse, here the pulse SE5, the signal DETS is on 0 in the monitoring window W5. The signal VREF is therefore calibrated with an amplitude substantially lower than V1. The detection phase PH2 starts at the pulse SE6. When the pulse SEN of amplitude V2 lower than V1 appears, the signal VREF is higher than the amplitude V2 such that the signal DETS is on 1 in the monitoring window of rank N instead of being on 0.

As above, the implementation of the method of the present invention involves the microprocessor being programmed accordingly, which is, per se, within the understanding of those skilled in the art.

In the embodiment represented in FIG. 10, the monitoring circuit DECT3 simply comprises an analog-to-digital converter ADC and the actual monitoring of the envelope pulses is here performed by the microprocessor MP. The converter ADC thus receives the envelope signal SE at input and delivers a digital amplitude value DSE that is applied to ports of the microprocessor. The value DSE is for example coded on 10 bits and applied to ten ports PT3 to The present embodiment also comprises an adjustment phase PH1, here aiming to $PT_N$. calibrate a digital threshold DTH enabling the microprocessor to distinguish between the amplitudes V1 and V2 of the envelope pulses.

Figure 11:
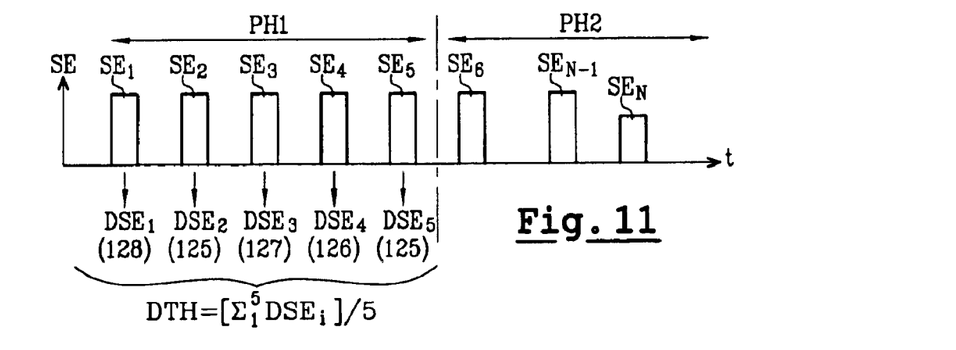
FIG. 11 represents electric signals showing an example of implementation of the method of the present invention by means of the circuit in FIG. 10.

An example of phase PH1 is shown in FIG. 11, which represents the appearance of the signal SE. It is considered as above that the reader emits five magnetic field pulses during the phase PH1, causing five envelope pulses SE1 to SE5 to appear. Upon each pulse, the microprocessor MP receives a corresponding amplitude value DSE, i.e. values DSE1, DSE2, DSE3, DSE4, DSE5, for example 128, 125, 127, 126 and 125. At the end of the phase PH1, the microprocessor MP calculates the digital threshold DTH, by calculating the mean value DSEa of the values DSE1 to DSE5 (i.e. here 126.2) for example and by applying a moderating factor to it, such as 0.95 for example. The detection phase PH2 starts at the pulse SE6 and the microprocessor compares the amplitude value of each envelope pulse with the threshold DTH. When the envelope pulse $SE_N$ of amplitude V2 appears, the corresponding amplitude value $DSE_N$ is below the threshold DTH and the microprocessor MP deduces the presence of a contactless integrated circuit therefrom.

As above, the implementation of the method of the present invention involves programming the microprocessor MP, which is, per se, within the understanding of those skilled in the art.

Various alternatives of this embodiment of the method of the present invention may be made.

According to one alternative, the microprocessor MP calculates the mean value DSEa of the amplitude values in a sliding time window comprising the last N pulses of the envelope signal, such as the last five pulses for example, and constantly refreshes the threshold DTH. Upon each new pulse, the microprocessor MP compares the amplitude value DSEi of the last pulse of the envelope signal with the threshold DTH. If the new amplitude value DSEi is not below the threshold DTH, it is incorporated into the mean value DSEa and a new value of the threshold DTH is calculated. Otherwise, the microprocessor MP considers that an integrated circuit is detected.

According to another alternative embodiment of the present invention, the microprocessor MP calculates upon each new pulse an amplitude variation ΔDSE equal to the difference between the mean value DSEa and the amplitude value DSEi of the last pulse of the envelope signal, i.e. ΔDSE=DSEa-DSEi, "i" being an index. The amplitude variation ΔDSE is compared with a predetermined threshold DTHD, which is here a differential threshold, for example a percentage of the mean value DSEa. If the variation ΔDSE is below the threshold DTHD, it is not considered to be significant and the new amplitude value DSEi is incorporated into the mean value DSEa. If, on the contrary, the variation ΔDSE is above the threshold DTHD, the microprocessor MP considers than an integrated circuit is detected.

Furthermore, it is possible to consider taking into account a hypothesis provided by the applicant, according to which the appearance of the contactless integrated circuit within the communication perimeter of the reader can cause a temporary increase in the amplitude of the envelope signal, followed by a decrease. Subject to more thorough testing, such a phenomenon could occur when there is a determined relation between the specific frequency of the antenna circuit of a contactless integrated circuit and the specific frequency of the antenna circuit of a reader.

Although this case can be considered exceptional, it is within the framework of the present invention to provide, for whatever purpose it may serve, a detection of the amplitude variations of the envelope signal in which the sign of the variations is not taken into account. This involves yet another alternative embodiment of the method described above, wherein it is considered that an integrated circuit is detected when DSEi>DSEa, which corresponds to a negative variation ΔDSE if by definition ΔDSE=DSEa-DSEi, or a positive variation ΔDSE if by definition ΔDSE=DSEi–DSEa.

In practice, monitoring the envelope signal only in relation to the absolute value of the variation ΔDSE makes it possible to simultaneously take into account an increase or a decrease in the amplitude value in excess of the threshold DTHD. In this case, an integrated circuit is presumed to be detected when the amplitude of the envelope signal suddenly drops or when it suddenly rises.

Corresponding alternatives of the detection circuits described above, which use a comparator, are possible by using for example two comparators and two reference signals VREF1, VREF2, one being higher and the other lower than the amplitude of the envelope signal in the absence of the contactless integrated circuit to be detected.

Furthermore, it should be noted that the method according to the present invention enables a "pre-detection" of an integrated circuit to be performed rather than a complete and definite detection as permitted by receiving an identification message. An integrated circuit reader 10 implementing the method according to the present invention may potentially be "misled" by the introduction of a metal object into the vicinity of the reader, such as a coin for example, causing the envelope signal to decrease. That is why, when an integrated circuit is presumed to be detected by means of the method of the present invention, the reader 10 satisfies itself thereof by then sending a magnetic field burst enabling the contactless integrated circuit to send an identification message, preceded or not by an identification request. Receiving the identification message allows the presence of the integrated circuit to be confirmed or not and as applicable, communication to be engaged.

Finally, while embodiments described herein have been described with features to save on the current consumption of a reader 10 having an autonomous power supply system, such as a battery or a cell, the present invention can be implemented in any type of reader, including those powered by the mains (in hard wired power sources). Generally speaking, a reader according to the present invention can be marketed with, in its operating program, an "active stand-by mode management" option that the user can choose to activate or not according to the intended application.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A contactless integrated circuit reader comprising a tuned antenna coil for emitting an oscillating magnetic field and means for detecting the presence of a contactless integrated circuit comprising an antenna coil within a communication perimeter of the reader, the detection means comprising:

means for emitting short magnetic field pulses, means for extracting from the antenna coil an envelope signal having envelope pulses corresponding to the magnetic field pulses, and means for monitoring the amplitude of the envelope pulses, configured to detect an object the introduction of which into the communication perimeter of the reader substantially de-tunes the antenna coil of the integrated circuit reader, and comprise:

means for, during a calibration phase, determining a detection threshold using the mean value of the amplitude of the envelope pulses, so that the amplitude of the envelope pulses during the calibration phase is substantially above the detection threshold while being very close to the detection threshold, and means for, during a detection phase, detecting at least one envelope pulse having an amplitude below the detection threshold, to deduce therefrom that an object has been introduced into the communication perimeter relative to the time at which the calibration phase was performed, the reader being arranged to send an identification request when an envelope pulse has an amplitude below the detection threshold, so as to determine whether the object that has entered the communication perimeter is a contactless integrated circuit or not.

2. The reader according to claim 1, wherein the monitoring means emit very short magnetic field pulses, shorter than a duration required by a contactless integrated circuit to extract electrical energy from the magnetic field and to consume this electrical energy.

3. The reader according to claim 1, wherein the monitoring means emit magnetic field pulses having a duration that is less than or equal to 100 microseconds.

4. The reader according to claim 1, wherein the monitoring means comprise means for comparing amplitude variations of the envelope pulses with a variation threshold that is determined relative to the mean value of the pulses.

5. The reader according to claim 1, wherein the monitoring means comprise comparison means for comparing the amplitude of the envelope pulses with the detection threshold.

6. The reader according to claim 5, wherein the monitoring means comprise means for supplying a digital detection threshold and a digital-to-analog converter for transforming the digital detection threshold into an analog detection threshold supplied to the comparison means.

7. The reader according to claim 5, wherein the monitoring means comprise a capacitor and means for charging the capacitor using the envelope pulses, so as to obtain the detection threshold.

8. The reader according to claim 1, further comprising:

an analog-to-digital converter for converting the envelope pulses into a digital amplitude signal comprising amplitude values representative of the amplitude of the envelope pulses, and means for calculating during the calibration phase a mean value of the digital amplitude values, deducing therefrom a digital detection threshold value by applying a moderating factor to the mean value and, during the detection phase, comparing the digital amplitude values with the digital threshold value.

9. The reader according to claim 8, wherein the monitoring means are arranged for adjusting the digital threshold in real time by using the amplitude values of the envelope pulses corresponding to N last magnetic field pulses emitted.

10. A method for detecting the presence of a contactless integrated circuit comprising an antenna coil within a communication perimeter of a contactless integrated circuit reader comprising a tuned antenna coil for emitting an oscillating magnetic field, the method comprising:

emitting short magnetic field pulses, extracting from the antenna coil an envelope signal having envelope pulses corresponding to the magnetic field pulses, and monitoring the amplitude of the envelope pulses, the monitoring of the envelope pulses includes:

a calibration phase for determining a detection threshold using the mean value of the amplitude of the envelope pulses, so that the amplitude of the envelope pulses during the calibration phase is substantially above the detection threshold while being very close to the detection threshold, and a detection phase for detecting at least one envelope pulse having an amplitude below the detection threshold, to deduce therefrom that an object has been introduced into the communication perimeter relative to the time at which the calibration phase was performed, and sending an identification request when an envelope pulse has an amplitude below the detection threshold, to determine whether the object having entered the communication perimeter is a contactless integrated circuit or not.

11. The method according to claim 10, further comprising the emission of magnetic field pulses the duration of which is shorter than the duration required by a contactless integrated circuit to extract electrical energy from the magnetic field and to consume this electrical energy.

12. The method according to claim 10, further comprising the emission of magnetic field pulses the duration of which is shorter than or equal to 100 microseconds.

13. The method according to claim 10, wherein an object is detected when the amplitude of the envelope pulses has a variation higher than a variation threshold that is determined relative to the mean value of the pulses.

14. The method according to claim 10, further comprising the following steps of:

generating a detection threshold of determined amplitude, and during the calibration phase, adjusting the amplitude of the threshold so that it is lower than the amplitude of the envelope pulses.

15. The method according to claim 10, wherein the detection threshold is a voltage taken off at one terminal of a capacitor charged by means of the envelope pulses.

16. The method according to claim 10, further comprising:

converting the envelope pulses into a digital amplitude signal comprising amplitude values representative of the amplitude of the envelope pulses, and during the calibration phase, calculating a mean value of the digital amplitude values, deducing therefrom a digital detection threshold value by applying a moderating factor to the mean value, and during the detection phase, comparing the digital amplitude values with the digital threshold value.

17. The method according to claim 16, wherein the detection threshold is adjusted in real time by using the amplitude values of the envelope pulses corresponding to N last magnetic field pulses emitted.

* * * * *